United States Patent
Takao (10) Patent No.: US 8,818,180 B2
(45) Date of Patent: Aug. 26, 2014

(54) VIDEO REPRODUCING APPARATUS, VIDEO REPRODUCING METHOD, AND PROGRAM

(75) Inventor: Yoshiyuki Takao, Tokyo (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 13/359,924

(22) Filed: Jan. 27, 2012

(65) Prior Publication Data

US 2012/0201520 A1 Aug. 9, 2012

(30) Foreign Application Priority Data

Feb. 7, 2011 (JP) .................................. 2011-023939

(51) Int. Cl.
*H04N 5/93* (2006.01)

(52) U.S. Cl.
USPC ............... 386/354; 386/239; 386/353; 725/9; 725/10; 725/14; 345/204

(58) Field of Classification Search
USPC ............ 725/9, 10, 13, 14, 135; 345/204, 428, 345/593, 605; 386/230, 239, 248, 291, 299, 386/353–356
See application file for complete search history.

(56) References Cited

U.S. PATENT DOCUMENTS

| | | | | |
|---|---|---|---|---|
| 5,880,728 | A * | 3/1999 | Yamaashi et al. | 715/803 |
| 2002/0052975 | A1* | 5/2002 | Yamamoto et al. | 709/251 |
| 2005/0120366 | A1* | 6/2005 | Thurbon | 725/9 |
| 2008/0025390 | A1* | 1/2008 | Shi et al. | 375/240.02 |
| 2008/0279286 | A1* | 11/2008 | Kobayashi | 375/240.26 |
| 2009/0257733 | A1* | 10/2009 | Ellis | 386/83 |
| 2010/0169905 | A1* | 7/2010 | Fukuchi et al. | 725/10 |
| 2010/0182336 | A1* | 7/2010 | Haga et al. | 345/593 |
| 2010/0211966 | A1* | 8/2010 | Zhang et al. | 725/10 |
| 2011/0050656 | A1* | 3/2011 | Sakata et al. | 345/204 |
| 2011/0248986 | A1* | 10/2011 | Neubrand | 345/418 |

* cited by examiner

*Primary Examiner* — Hung Dang
*Assistant Examiner* — Mishawn Dunn
(74) *Attorney, Agent, or Firm* — Sony Corporation (57) ABSTRACT

A video reproducing apparatus includes a decoding unit performing decoding of coded video signals of multiple viewpoints, a load detecting unit detecting a process load on the decoding unit, and a control unit controlling the decoding unit in accordance with the detected process load and reducing a load of the decoding from a viewpoint with a low degree of priority.

16 Claims, 9 Drawing Sheets

VIDEO REPRODUCING APPARATUS, VIDEO REPRODUCING METHOD, AND PROGRAM

BACKGROUND

The present technology relates to a video reproducing apparatus, video reproducing method, and program. In detail, the present technology allows real-time reproduction of coded video signals while suppressing a visually-unfavorable impression at the time of reproduction of videos of multiple viewpoints.

In related art, when coded video signals generated by coding with a coding technique, typified by the MPEG2 technique, the H.264/AVC technique, or the like, are reproduced, if processing performance of a video reproducing apparatus is low or a load of another process is high, a delay occurs in reproduction of the video signals.

To get around this, in Japanese Unexamined Patent Application Publication No. 2008-22475, filtering and motion compensation are switched and frame skipping or the like is performed in accordance with the load state, thereby allowing real-time reproduction of coded video signals while suppressing a visually-unfavorable impression.

SUMMARY

Meanwhile, in reproduction of coded video signals of multiple viewpoints, when load reduction for reducing the load of decoding is performed in accordance with the load state, visual influences are different for different viewpoints for which load reduction is performed, and an unfavorable impression may become conspicuous.

It is desirable to provide a video reproducing apparatus, video reproducing method, and program allowing real-time reproduction of coded video signals while suppressing a visually-unfavorable impression at the time of reproduction of videos of multiple viewpoints.

According to an embodiment of the present technology, a video reproducing apparatus includes a decoding unit performing decoding of coded video signals of multiple viewpoints, a load detecting unit detecting a process load on the decoding unit, and a control unit controlling the decoding unit in accordance with the detected process load and reducing a load of the decoding from a viewpoint with a low degree of priority.

In the embodiment of the present technology, the process load on the decoding unit decoding coded video signals of multiple viewpoints is detected, and the load of the decoding is reduced from a viewpoint with a lower degree of priority in accordance with the detected process load. For example, when a video signal outputted from the decoding unit is delayed or when the amount of signals in a buffer temporarily storing video signals outputted from the decoding unit becomes smaller than a predetermined amount, the load of the decoding is determined as being high, and a load reducing process is performed. In load reduction, the degree of priority of a viewpoint from which the user is not viewing is lowered, and frame skipping or the like is performed on coded video signals of the viewpoint from which the user is not viewing. When it is not determined that there is a viewpoint from which the user is not viewing, whether there is a difference in degree of importance among videos for respective viewpoints is determined, and the degree of priority of a viewpoint with a low degree of importance is lowered. For example, videos with a low bit rate and videos not to be referred to in inter-view prediction are taken as being for a viewpoint with a low degree of importance. Furthermore, when it is neither determined that there is a viewpoint from which the user is not viewing nor determined that there is a difference in degree of importance among the videos for the respective viewpoints, videos other than those on a dominant eye side of the user are determined as being for a viewpoint with a low degree of priority. Furthermore, when it is not determined which eye is a dominant eye of the user, the degree of priority of a non-base view is lowered, and load reduction of the decoding is performed from the non-base view. Still further, in the video reproducing apparatus, when a frame to be decoded is skipped for load reduction, a video of the skipped frame is generated by interpolation using videos for another viewpoint or videos of the previous and subsequent frames.

According to another embodiment of the present technology, a video reproducing method includes performing decoding of coded video signals of multiple viewpoints, detecting a process load of the decoding, and reducing a load of the decoding from a viewpoint with a low degree of priority in accordance with the detected process load.

According to still another embodiment of the present technology, a program causing decoding of coded data of videos of multiple viewpoints to be performed on a computer, the program includes performing decoding of coded video signals of the multiple viewpoints, detecting a process load of the decoding, and reducing a load of the decoding from a viewpoint with a low degree of priority in accordance with the detected process load.

Note that the program according to the still other embodiment of the present technology is a program that can be provided in a computer-readable format to a general-purpose computer system that can execute various program codes via a storage medium or a communication medium, for example, a storage medium such as an optical disk, a magnetic disk, or a semiconductor memory, or a communication medium such as a network. By providing this program in a computer-readable format, processes according to the program are performed on the computer system.

According to the embodiments of the present technology, the process load of the decoding of coded video signals of multiple viewpoints is detected, and the load of the decoding is reduced from a viewpoint with a lower degree of priority in accordance with the detected process load. For this reason, the load of the decoding is reduced from the viewpoint with the lower degree of priority, and therefore a visually-unfavorable impression can be suppressed even with the load reduction. Also, with the load reduction, the load of the decoding is reduced, and therefore real-time reproduction can be performed.

DETAILED DESCRIPTION OF EMBODIMENTS

Figure 1:
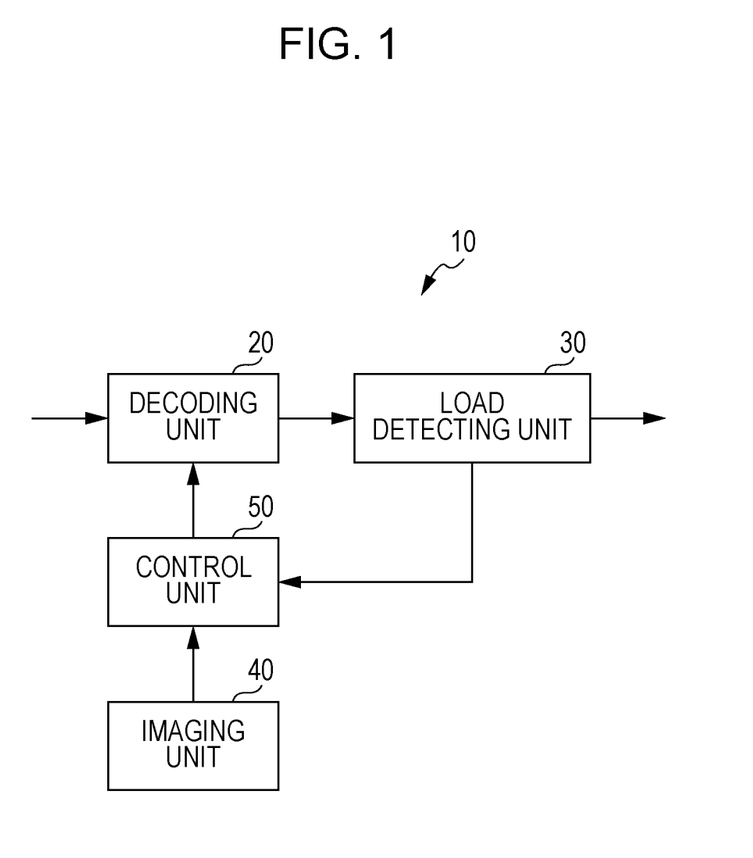
FIG. 1 is a diagram of an example of structure of a video reproducing apparatus.

Embodiments of the present technology are described below. Note that the description is made according to the order below.
1. Structure of the Video Reproducing Apparatus
2. Operation of the Video Reproducing Apparatus
3. In the Case of Software Processing
1. Structure of the Video Reproducing Apparatus FIG. 1 depicts an example of structure of a video reproducing apparatus according to an embodiment of the present technology. This video reproducing apparatus 10 includes a decoding unit 20 decoding a coded video signal inputted from the previous stage, a load detecting unit 30 detecting a process load on the decoding unit 20, an imaging unit 40, and a control unit 50 controlling the decoding unit 20.

The decoding unit 20 decodes an inputted coded video signal in accordance with a decoding technique corresponding to the coding technique under the control of the control unit 50, and outputs a video signal obtained as a decoding result via the load detecting unit 30.

The load detecting unit 30 detects a process load on the decoding unit 20 from a delay time of, for example, the video signal supplied from the decoding unit 20, that is, a difference between the timing when the signal was outputted from the decoding unit 20 and the timing when the signal was supposed to be outputted, and notifies the control unit 50 of the process load detection result. For example, when a delay time occurs, the load detecting unit 30 notifies the control unit 50 that the process load on the decoding unit 20 is high. Note that when the video signal supplied from the decoding unit 20 is to be outputted to a display or the like at a later stage, the load detecting unit 30 makes an adjustment so that the signal is outputted at the timing when the signal is supposed to be outputted. Also, the load detecting unit 30 may detect a process load on the decoding unit 20 based on the amount of signals in a buffer where video signals to be outputted are temporarily accumulated, for example, the amount of signals accumulated in a screen sorting buffer, which will be described further below, included in the decoding unit 20.

The imaging unit 40 is provided so as to determine the position of a user viewing the video displayed based on the video signals outputted from the decoding unit 20 via the load detecting unit 30. The imaging unit 40 outputs a video signal obtained by imaging a video viewer's side to the control unit 50.

The control unit 50 controls the decoding unit 20 in accordance with the load detection result of which the control unit 50 is notified from the load detecting unit 30 to reduce the load of the decoding from a viewpoint with a lower degree of priority. The control unit 50 also determines the position of the user based on the video signal supplied from the imaging unit 40 and, based on the determination result, determines a viewpoint with a low degree of priority.

Figure 2:
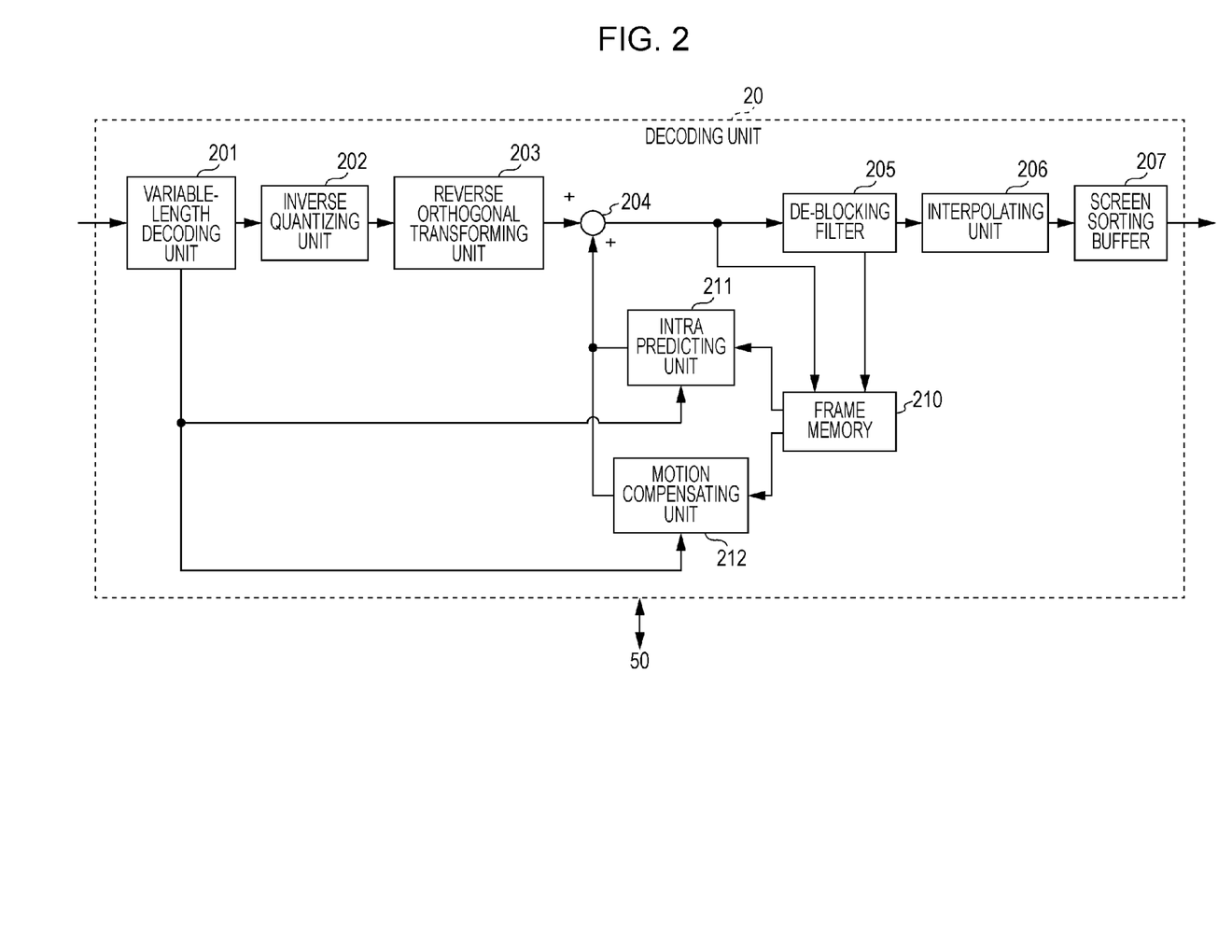
FIG. 2 is a diagram of an example of structure of a decoding unit.

FIG. 2 depicts an example of structure of the decoding unit 20. The decoding unit 20 includes a variable-length decoding unit 201, an inverse quantizing unit 202, a reverse orthogonal transforming unit 203, an adding unit 204, a de-blocking filter 205, an interpolating unit 206, and a screen sorting buffer 207. The decoding unit 20 further includes a frame memory 210, an intra predicting unit 211, and a motion compensating unit 212.

The variable-length decoding unit 201 outputs quantized data obtained by decoding the coded video signals to the inverse quantizing unit 202. The variable-length decoding unit 201 also outputs predicted mode information obtained by decoding the coded video signals to the intra predicting unit 211 and the motion compensating unit 212.

The inverse quantizing unit 202 performs inverse quantization on the quantized data supplied from the variable-length decoding unit 201 by using a technique corresponding to a quantizing technique used in coding the video signal. The inverse quantizing unit 202 outputs a conversion factor obtained by inverse quantization to the reverse orthogonal transforming unit 203.

The reverse orthogonal transforming unit 203 performs reverse orthogonal transformation by using a technique corresponding to an orthogonal transforming technique used in coding the video signals. The reverse orthogonal transforming unit 203 outputs an error video signal obtained by reverse orthogonal transformation to the adding unit 204.

The adding unit 204 adds the error video signal supplied from the reverse orthogonal transforming unit 203 and a predicted video signal supplied from the intra predicting unit 211 or the motion compensating unit 212 together to generate a decoded video signal for output to the de-blocking filter 205 and the frame memory 210.

The de-blocking filter 205 performs de-blocking filtering on the decoded video signal supplied from the adding unit 204, and outputs the video signal with block distortion removed therefrom to the interpolating unit 206 and the frame memory 210.

The interpolating unit 206 generates a video signal of a skipped frame by interpolation when frame skipping is performed to maintain real-time reproduction. The interpolating unit 206 outputs the video signal after interpolation to the screen sorting buffer 207.

The screen sorting buffer 207 sorts videos. The screen sorting buffer 207 sorts the sequence of frames sorted in coding to the original display sequence for output.

The frame memory 210 stores therein a decoded video signal before filtering is performed at the de-blocking filter 205 and a decoded video signal after filtering is performed at the de-blocking filter 205.

The intra predicting unit 211 performs intra prediction based on the predicted mode information supplied from the variable-length decoding unit 201 by using video signals before de-blocking filtering stored in the frame memory 210 to generate a predicted video signal for output to the adding unit 204.

The motion compensating unit 212 performs motion compensation based on the predicted mode information supplied from the variable-length decoding unit 201 by using video signals after de-blocking filtering stored in the frame memory 210 to generate a predicted video signal for output to the adding unit 204.

Note that a detection of the process load on the decoding unit 20 is not restricted to a detection by the load detecting unit 30 based on a delay time of a video signal supplied from the decoding unit 20 as described above. For example, the process load can be detected from the amount of the video signals accumulated in the screen sorting buffer 207. That is, when a video signal is outputted at a predetermined timing from the screen sorting buffer 207, if the process load on the decoding unit 20 is high, the amount of video signals accumulated is decreased, and video signals that can be outputted at the predetermined timing become depleted. Therefore, by monitoring the amount of video signals accumulated in the screen sorting buffer 207, the load detecting unit 30 can detect whether the process load on the decoding unit 20 is in a high state.

2. Operation of the Video Reproducing Apparatus

Figure 3:
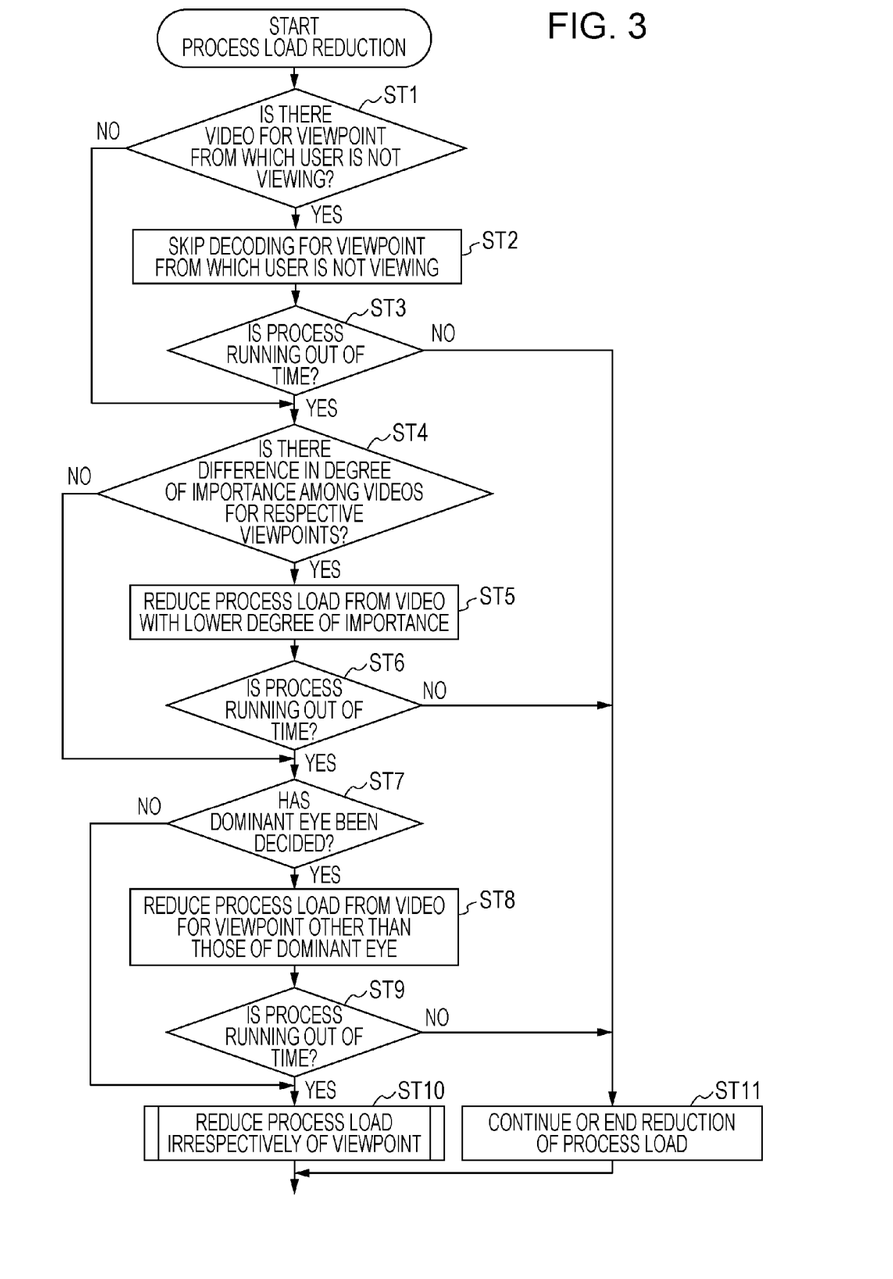
FIG. 3 is a diagram of part of the operation of the video reproducing apparatus.
Figure 4:
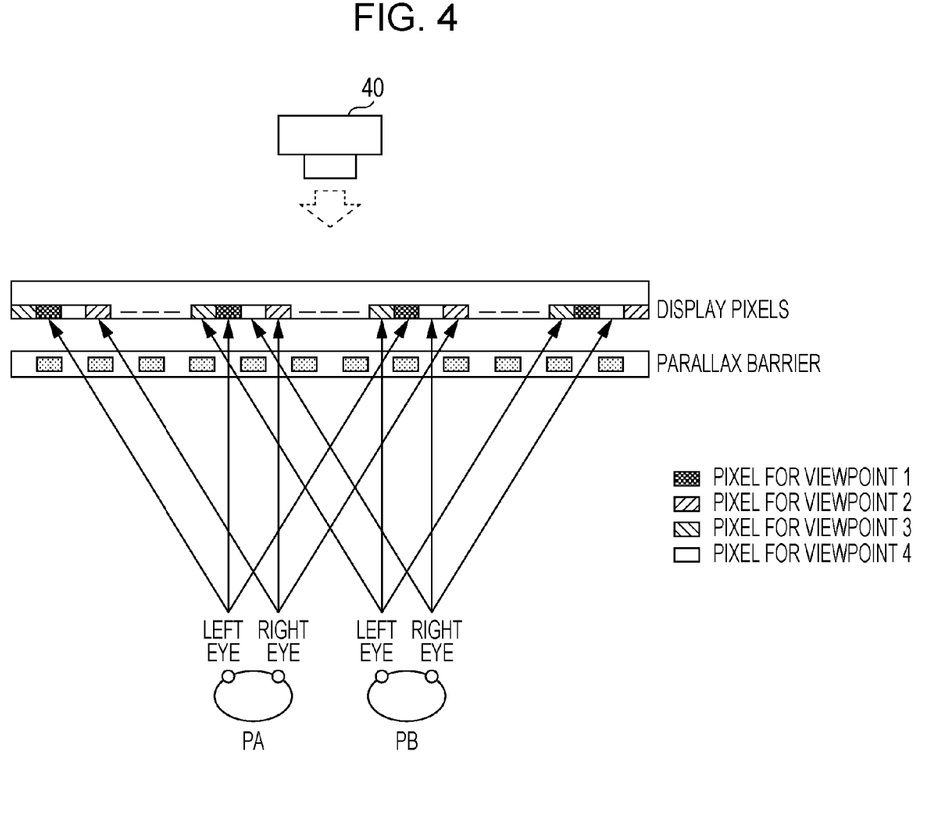
FIG. 4 is a diagram for describing a method of estimating videos from a viewpoint from which a user is not viewing.

FIG. 3 is a flowchart of part of the operation of the video reproducing apparatus. At step ST1, the control unit 50 determines whether there is a video for a viewpoint from which the user is not viewing. FIG. 4 is a diagram for describing a method of estimating a video for a viewpoint from which the user is not viewing. In a multiple-viewpoint parallax barrier technique, videos for use vary depending on the position of the user, that is, the position of a viewer who is viewing a display based on video signals outputted from the decoding unit 20. For example, at a position PA, if there are videos for a viewpoint 1 and a viewpoint 2, stereoscopic vision is possible. At a position PB, if there are videos for a viewpoint 3 and a viewpoint 4, stereoscopic vision is possible. Therefore, when the viewer is at the position PA, videos for the viewpoint 3 and the viewpoint 4 are those of unused viewpoints. Similarly, when the viewer is at the position PB, the videos for the viewpoint 1 and the viewpoint 2 are those of unused viewpoints. The imaging unit 40 images a direction of the viewer who is viewing the display based on the video signals outputted from the decoding unit 20, and the control unit 50 determines the position of the viewer based on the video signal supplied from the imaging unit 40. Also, the control unit 50 determines the videos for the unused viewpoints at the determined position of the viewer as videos for viewpoints from which the user is not viewing. When the control unit 50 determines that there is a video for a viewpoint from which the user is not viewing, the procedure goes to step ST2. When the control unit 50 does not determine that there is a video for a viewpoint from which the user is not viewing, the procedure goes to step ST4.

At step ST2, the control unit 50 skips decoding for the viewpoint from which the user is not viewing. The control unit 50 skips the decoding by taking the video for the viewpoint from which the user is not viewing determined at step ST1 as having a low degree of priority in decoding, and the procedure then goes to step ST3.

At step ST3, the control unit 50 determines whether the process is running out of time. When determining based on the load detection result from the load detecting unit 30 that recovery from a delay of the video signals outputted from the decoding unit 20 is not possible even by skipping the decoding for the viewpoint from which the user is not viewing, the control unit 50 determines that the process is running out of time, and the procedure then goes to step ST4. On the other hand, when determining based on the load detection result from the load detecting unit 30 that recovery from a delay of the video signals outputted from the decoding unit 20 has been made, the control unit 50 determines that the process is not running out of time, and the procedure then goes to step ST11. Note that when the process load is detected based on the amount of signals accumulated in the screen sorting buffer 207, it is determined that the process is not running out of time when, for example, the amount of signal accumulated in the screen sorting buffer 207 is not equal to or lower than a predetermined amount.

At step ST4, the control unit 50 determines whether there is a difference in degree of importance among the videos for the respective viewpoints. The control unit 50 takes videos with a high bit rate and videos to be referred to in inter-view prediction (for example, base views) as having a high degree of importance, and videos with a low bit rate and videos not to be referred to in inter-view prediction (for example, non-base videos) as having a low degree of importance. The control unit 50 determines whether there is a difference in degree of importance among the videos for the respective viewpoints and, when it is determined that there is such a difference, the procedure then goes to step ST5. When it is not determined that there is such a difference, the procedure goes to step ST7.

Regarding a difference in bit rate, for example, one head GOP can be analyzed, and a bit rate for videos for the respective viewpoints can be predicted for comparison. Also, whether the videos are those to be referred to in inter-view prediction can be determined by referring "inter_view flag", which is a syntax of a NAL unit header extension (nal_unit_header_mvc_extension( )) defined by the standards for multiple-viewpoint video coding.

At step ST5, the control unit 50 reduces the process load from a video for a viewpoint with a lower degree of importance, and the procedure then goes to step ST6. Note that reduction of the process load will be described further below.

At step ST6, the control unit 50 determines whether the process is running out of time. The control unit 50 makes a determination in a manner similar to that of step ST3. When it is determined that the process is running out of time, the procedure goes to step ST7. When it is determined that the process is not running out of time, the procedure goes to step ST11.

At step ST7, the control unit 50 determines that whether a dominant eye has been decided. When determining that a dominant eye has been decided, for example, if a user operation for specifying a dominant eye has been performed, the procedure goes to step ST8. When determining that a dominant eye has not been decided, the procedure goes to step ST10.

At step ST8, the control unit 50 reduces the process load from a video for a viewpoint other than those of the dominant eye, and the procedure then goes to step ST9.

At step ST9, the control unit 50 determines whether the process is running out of time. The control unit 50 makes a determination in a manner similar to that of step ST3. When it is determined that the process is running out of time, the procedure goes to step ST10. When it is determined that the process is not running out of time, the procedure goes to step ST11.

At step ST10, since the process is running out of time, the control unit 50 reduces the process load irrespectively of the viewpoint. On the other hand, at step ST11, since the process is not running out of time, the control unit 50 continues or ends the reduction of the process load.

As such, the control unit 50 controls the decoding unit 20 to reduce the load of the decoding from a viewpoint with a lower degree of priority in decoding, thereby lowering the degree of priority of the viewpoint from which the user is not viewing. When not determining that there is a viewpoint from which the user is not viewing, the control unit 50 determines whether there is a difference in degree of importance among the videos for the respective viewpoints, and lowers the degree of priority of a viewpoint with a low degree of importance. Furthermore, when neither determining that there is a viewpoint from which the viewer is not viewing nor determining that there is a difference in degree of importance among the videos for the respective viewpoints, the control unit 50 lowers the degree of priority of a viewpoint of the eye other than the dominant eye of the user. In this manner, the degree of priority is set, and the load is reduced for a viewpoint with a low degree of priority.

Note that the sequence of selecting a viewpoint for load reduction is not restricted to the sequence depicted in FIG. 3. The selection sequence may be changed, or some of the processes may be omitted.

Figure 5:
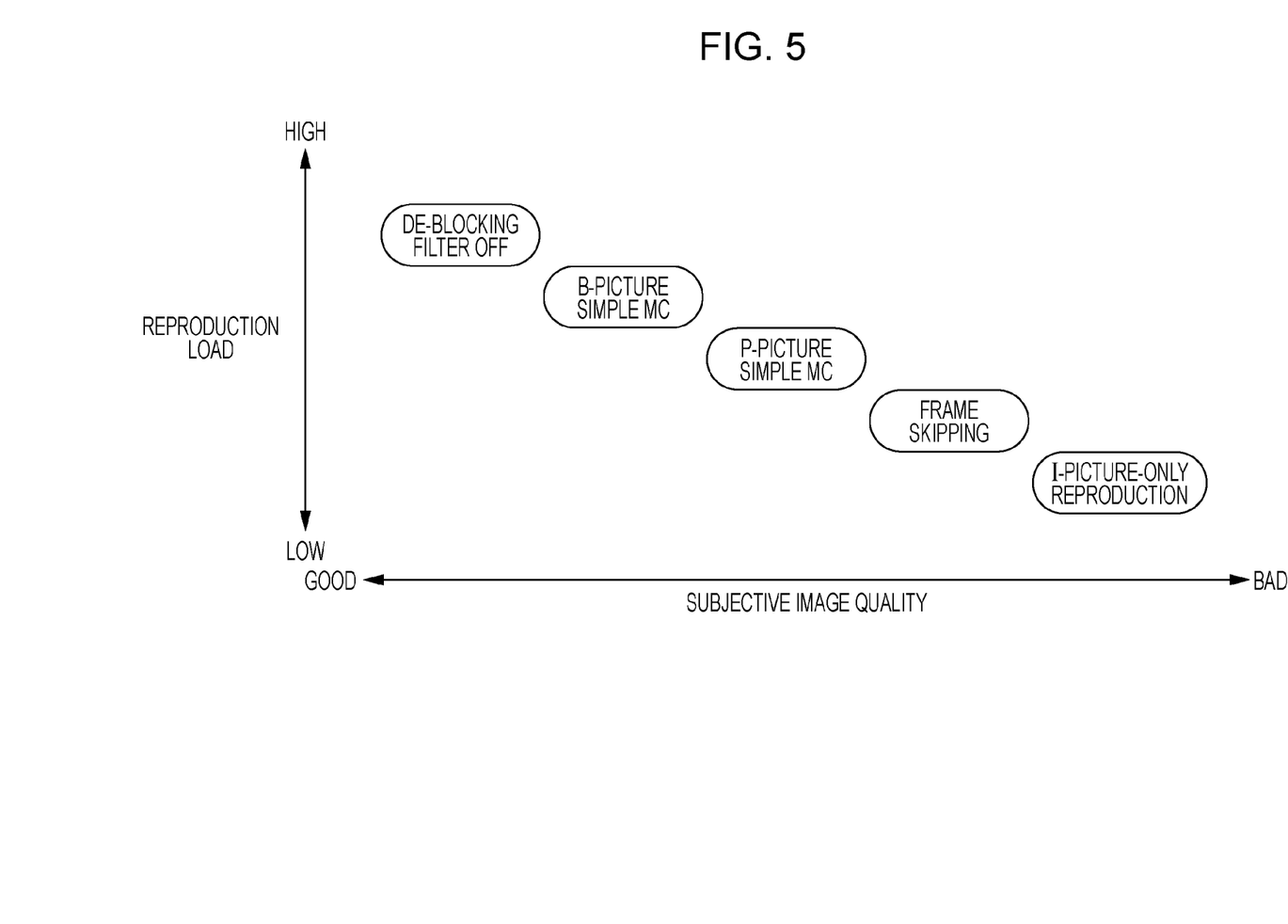
FIG. 5 is a diagram for describing reduction of a process load.

Next, reduction of the process load is descried. Reduction of the process load includes five types of processes as depicted in FIG. 5, for example: a de-blocking filter off process, a B-picture simple motion compensation (MC) process, a P-picture simple motion compensation (MC) process, a frame skipping process, and an I-picture-only reproducing process.

The control unit 50 causes these five types of processes to be performed so that these processes are sequentially added one by one until the process does not run out of time, thereby gradually reducing the process load.

In the de-blocking filter off process, the amount of computation is reduced by omitting the operation of the de-blocking filter 205. The de-blocking filter off process can be performed for each picture.

In the B-picture simple motion compensation process, at the time of bidirectional prediction of pictures previous and subsequent to a B picture in the motion compensating unit 212, the amount of computation is reduced by omitting motion compensation of one of the previous and subsequent pictures. Also, in place of a technique of computing motion compensation of a luminance signal defined by standards of the H.264/AVC technique, motion compensation of a color-difference signal with a small amount of computation is used to reduce the amount of computation. The B-picture simple motion compensation process can be performed for each picture.

In the P-picture simple motion compensation process, at the time of P-picture prediction in the motion compensating unit 212, in place of the technique of computing motion compensation of a luminance signal defined by standards of the H.264/AVC technique, motion compensation of a color-difference signal with a small amount of computation is used to reduce the amount of computation. The P-picture simple motion compensation process can be performed for each picture.

In the frame skipping process, picture decoding is restricted to be minimum for frame skipping, thereby reducing the amount of computation.

In the I-picture-only reproducing process, only an I picture among I, P, and B pictures is decoded and frame skipping is performed for the P and B pictures, thereby reducing the amount of computation.

Meanwhile, when frame skipping is performed, a video phase shift may occur among viewpoints, causing an unnatural stereoscopic video.

Figure 6:
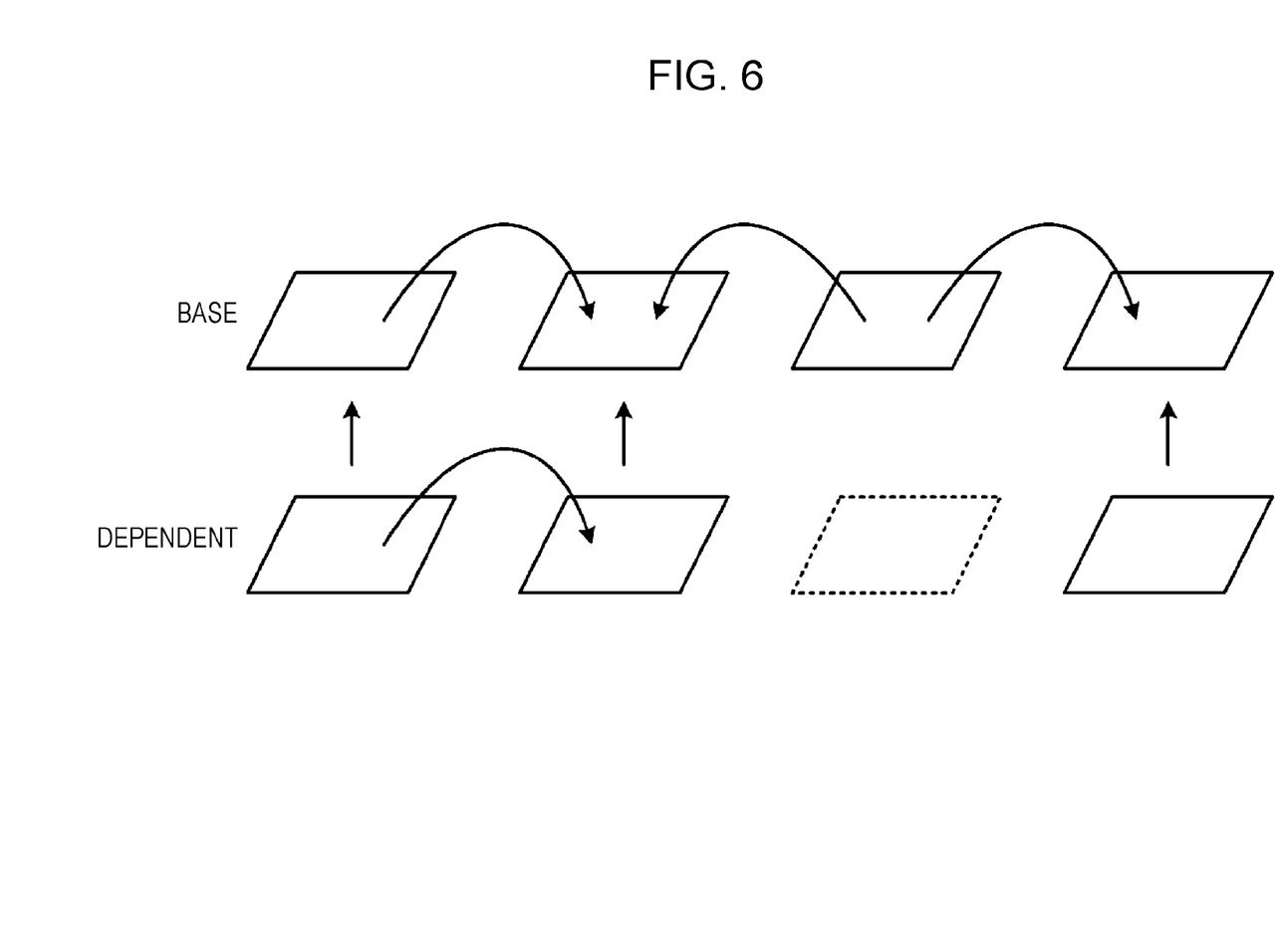
FIG. 6 is a diagram of an exemplary state in which frame skipping is performed.

FIG. 6 depicts an exemplary state in which frame skipping is performed. For example, when frame skipping is performed in dependent-view videos and a video of a frame surrounded by a broken line is not obtained, the number of frames becomes less than that in base view videos. For this reason, for example, when a video of an immediately-previous frame is repeatedly used, a phase difference in video occurs between base views and dependent views.

To get around this, when frame skipping is performed to reduce the process load, a video of a skipped frame is generated from the videos decoded by the interpolating unit 206. Also, the video of the skipped frame is generated when a process cost is lower than that in the case of performing decoding.

Figure 7:
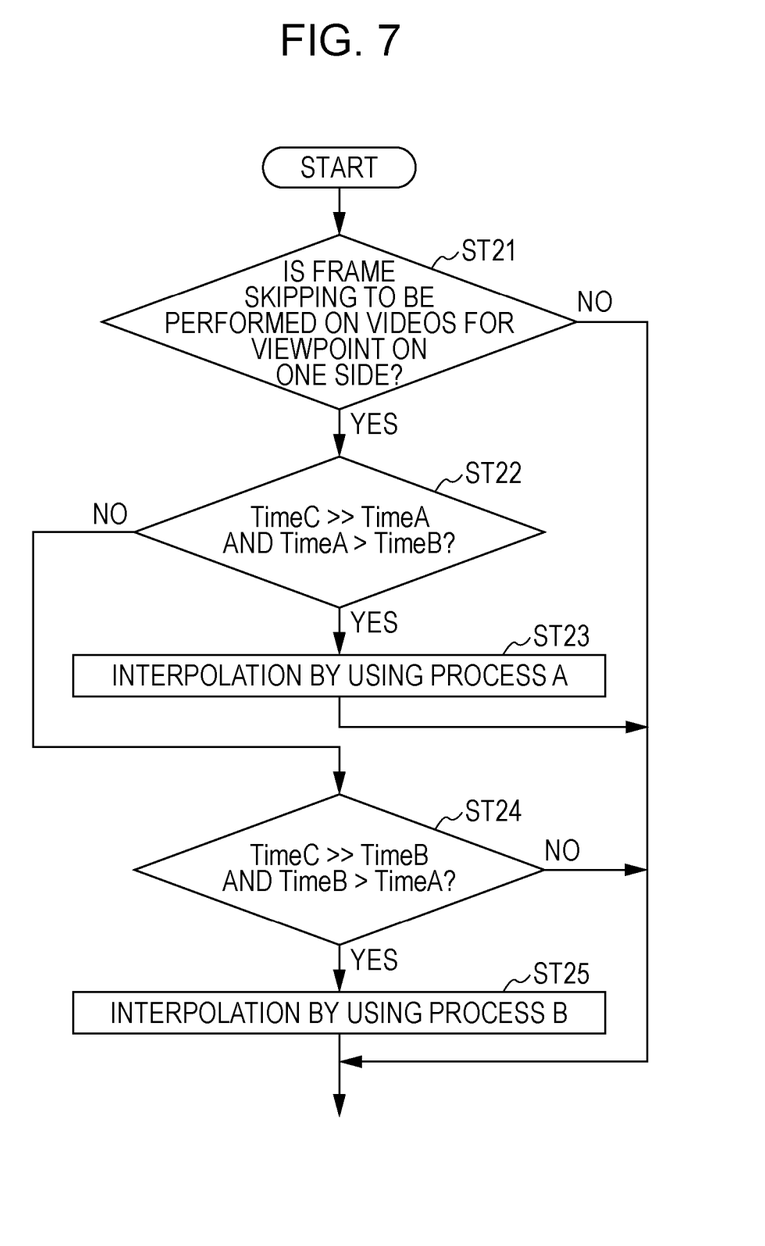
FIG. 7 is a flowchart of an interpolating operation to be performed correspondingly to reduction of the process load.

FIG. 7 is a flowchart of an interpolating operation to be performed correspondingly to reduction of the process load.

At step ST21, the control unit 50 determines whether frame skipping is to be performed on videos for a viewpoint on one side. When it is determined that frame skipping is to be performed on videos for a viewpoint on one side, the procedure goes to step ST22. When it is determined that frame skipping is not to be performed, the interpolating operation ends.

At step ST22, the control unit 50 determines whether a cost of a process A (TimeA) is sufficiently smaller than a cost of a process C (TimeC) and the cost of the process A (TimeA) is larger than a cost of a process B (TimeB).

The process A is a process of performing 2D-3D conversion from one frame of video for the other viewpoint for which frame skipping is not performed and generating a video at the same time as that of the skipped frame. Also, the cost of the process A indicates a time involved in the process A. For example, as depicted in FIG. 6, when a video of a frame surrounded by a broken line in dependent views is not obtained, as depicted in FIG. 8A, 2D-3D conversion is performed from one frame of video in the base views, and a video at the same time as that of the skipped frame is generated.

Figure 8A:
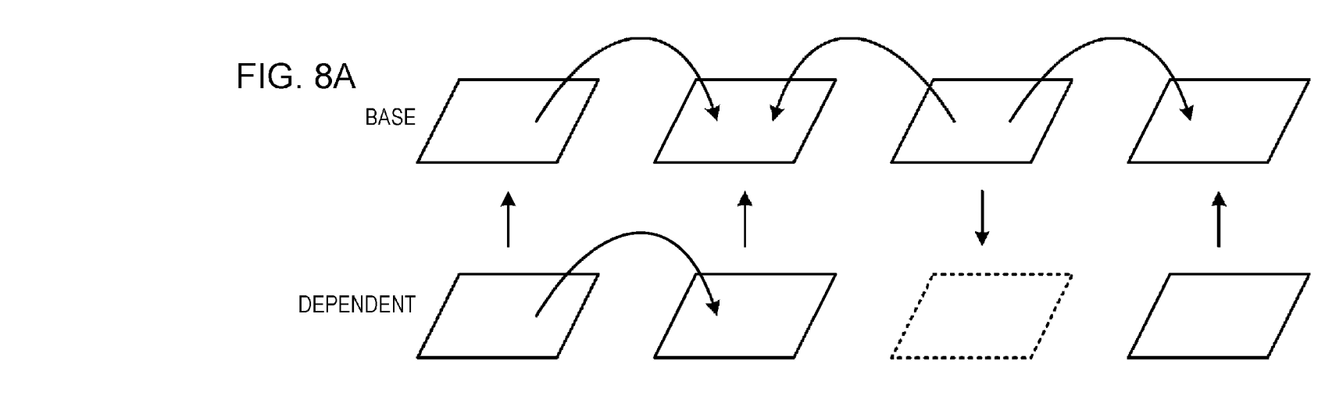
FIGS. 8A and 8B are drawings of a process of interpolating operation.
Figure 8B:
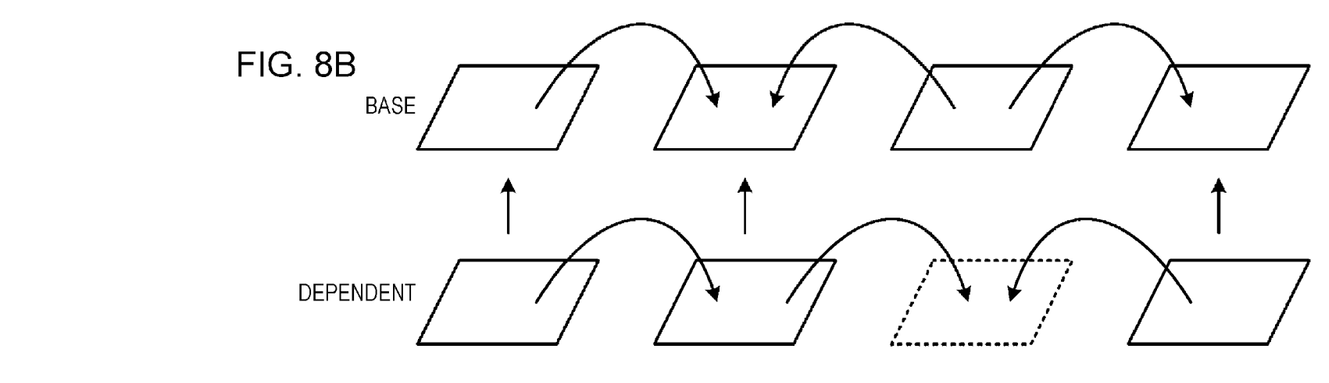

The process B is a process of generating a video at the same time as that of the skipped frame from one frame previous to and one frame subsequent to the skipped frame in videos for the viewpoint for which frame skipping has been performed. Also, the cost of the process B indicates a time involved in the process B. For example, as depicted in FIG. 6, when a video of a frame surrounded by a broken line in dependent views is not obtained, as depicted in FIG. 8B, a video at the same time as that of the skipped frame is generated from one frame previous to and one frame subsequent to the skipped frame in the videos of the dependent views.

The process C is a process of decoding any one frame, and the cost of the process C indicates a time involved in decoding.

When the control unit 50 determines that the cost of the process A (TimeA) is sufficiently smaller than the cost of the process C (TimeC) and the cost of the process A (TimeA) is larger than the cost of the process B (TimeB), the procedure goes to step ST23. When the control unit 50 determines otherwise, the procedure goes to step ST24.

At step ST23, the control unit 50 performs interpolation by using the process A. The control unit 50 controls the operation of the interpolating unit 206 of the decoding unit 20 to generate a video of the skipped frame by the process A, and then ends the interpolating operation.

At step ST24, when the control unit 50 determines whether the cost of the process B (TimeB) is sufficiently smaller than the cost of the process C (TimeC) and the cost of the process B (TimeB) is larger than the cost of the process A (TimeA).

When the control unit 50 determines that the cost of the process B (TimeB) is sufficiently smaller than the cost of the process C (TimeC) and the cost of the process B (TimeB) is larger than the cost of the process A (TimeA), the procedure goes to step ST25. On the other hand, when the control unit 50 determines otherwise, a cost involved in interpolation is not smaller than a cost involved in decoding, and therefore the interpolating operation ends.

At step ST25, the control unit 50 performs interpolation by using the process B. The control unit 50 controls the operation of the interpolating unit 206 of the decoding unit 20 to generate a video of the skipped frame by using the process B, and then ends the interpolating operation.

Note that while FIG. 7 depicts an example in which one of the process A and the process B that has a small cost is selected and performed, both of the process A and the process B may be performed to select an optimum video. In this case, these processes are performed when a total of a cost involved in performing the process A and the process B and a cost involved in selecting an optimum video is sufficiently smaller than the cost of the process C.

As such, when the cost involved in generating a video by interpolation is smaller than the cost involved in decoding one frame, the process with a smaller cost is selected to generate a video, thereby allowing not only reduction of the process load but also prevention of occurrence of a video phase difference.

Furthermore, reduction of the process load is performed not only in the sequence depicted in FIG. 5 but also by changing the execution sequence or by omitting some of the processes. Still further, the embodiments of the present technology can be applied not only to a video reproducing apparatus reproducing coded video signals encoded by the H.264/AVC technique but also a video reproducing apparatus reproducing coded video signals encoded by another coding technology such as the MPEG2 technique.

3. In the Case of Software Processing

The series of processing described above can be performed with hardware, software, or a composite structure of both. When processing by software is performed, a program having a process sequence recorded thereon is installed in a memory in a computer incorporated in dedicated hardware and is then executed. Alternatively, the program can also be installed and executed in a general-purpose computer that can perform various processes.

Figure 9:
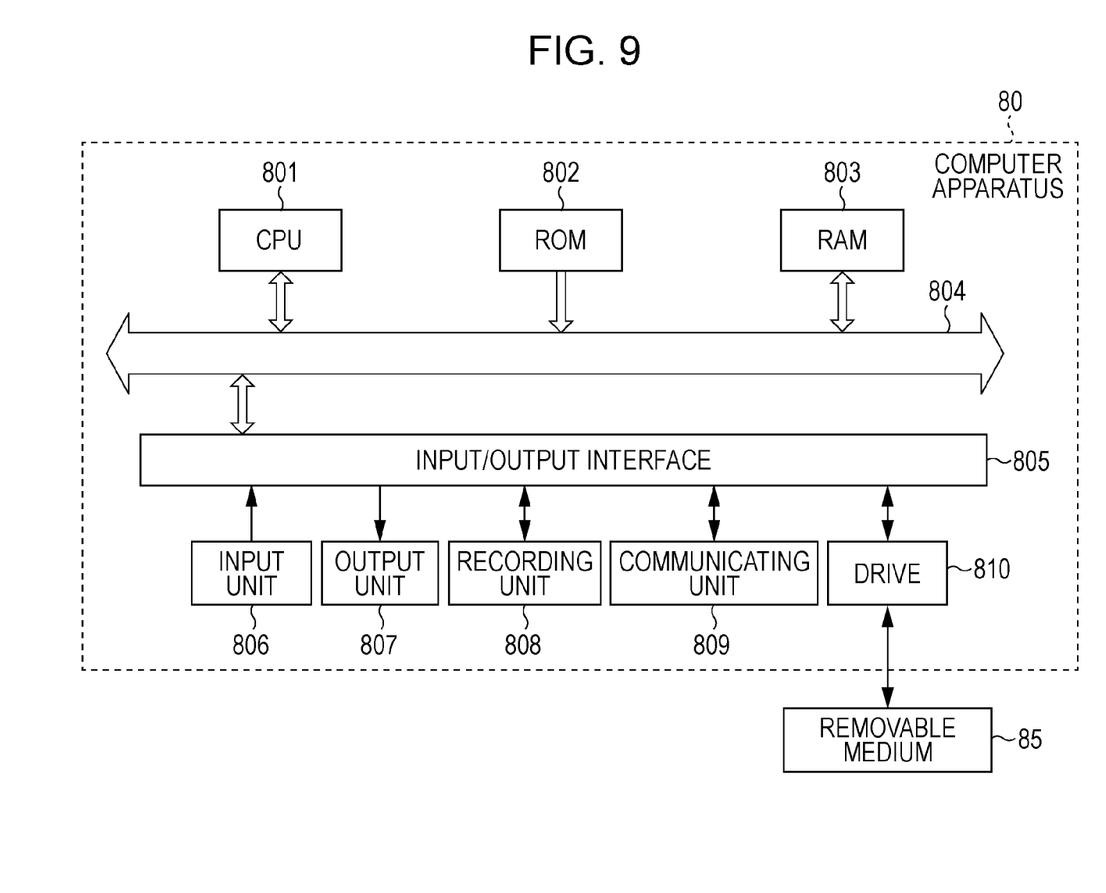
FIG. 9 is a diagram of an example of structure of a computer apparatus.

FIG. 9 is a diagram of an example of structure of a computer apparatus executing the series of processing described above with a program. A computer apparatus 80 has a CPU 801, which performs various processes according to a computer program recorded in a ROM 802 or a recording unit 808.

A RAM 803 stores therein as appropriate the computer program and data to be executed by the CPU 801. These CPU 801, ROM 802, and RAM 803 are mutually connected to one another via a bus 804.

Also, to the CPU 801, an input/output interface 805 is connected via the bus 804. To the input/output interface 805, an input unit 806 including a touch panel, a keyboard, a mouse, a microphone, and others and an output unit 807 including a display and others are connected. The CPU 801 performs various processes in response to an instruction inputted from the input unit 806. The CPU 801 then outputs the process result to the output unit 807.

The recording unit 808 connected to the input/output interface 805 includes, for example, a hard disk, and records therein the computer program and various pieces of data to be executed by the CPU 801. A communicating unit 809 communicates with an external apparatus via a network such as the Internet or a local area network or via a wired or wireless communication medium such as digital broadcasting. Also, the computer apparatus 80 may obtain a computer program via the communicating unit 809 for recording on the ROM 802 and the recording unit 808.

A drive 810 drives a removable medium 85 such as a magnetic disk, an optical disk, a magneto-optical disk, or a semiconductor memory, when inserted therein, and obtains a computer program and data recorded therein. The obtained computer program and data are transferred as appropriate to the ROM 802, the RAM 803, or the recording unit 808 as appropriate.

The CPU 801 reads and executes the computer program for performing the series of processing described above, and decodes coded video signals recorded on the recording unit 808 and the removable medium 85 and coded video signals supplied via the communicating unit 809.

Note that the present technology is not interpreted as being restricted to the embodiments described above. The embodiments of the present technology disclose the present technology in the form of examples, and it is obvious that a person skilled in the art can correct or replace the embodiments without deviating from the gist of the present technology.

That is, the substance of the present technology should be judged according to the embodiments of the present technology.

The present disclosure contains subject matter related to that disclosed in Japanese Priority Patent Application JP 2011-023939 filed in the Japan Patent Office on Feb. 7, 2011, the entire contents of which are hereby incorporated by reference.

What is claimed is:

1. A video reproducing apparatus comprising:
   a decoding unit configured to decode coded video signals that correspond to multiple viewpoints;
   a load detecting unit configured to detect a process load on the decoding unit; and
   a control unit configured to control the decoding unit based on the detected process load, and reduce a load of decoding one of the coded video signals that corresponds to a viewpoint with a degree of priority lower than one or more other viewpoints of the multiple viewpoints.

2. The video reproducing apparatus according to claim 1, wherein the control unit is configured to decrease a degree of priority of a viewpoint from which a user is not viewing.

3. The video reproducing apparatus according to claim 1, wherein the control unit is configured to decrease a degree of priority of a viewpoint with a degree of importance lower than the one or more other viewpoints of the multiple viewpoints when there is a difference in degree of importance among videos for the respective viewpoints.

4. The video reproducing apparatus according to claim 3, wherein the control unit is configured to determine the difference in degree of importance among the videos for the respective viewpoints when the control unit does not determine whether there is a viewpoint from which a user is not viewing.

5. The video reproducing apparatus according to claim 3, wherein the control unit is configured to assign a degree of importance to the multiple viewpoints based on a bit rate of the coded video signals.

6. The video reproducing apparatus according to claim 3, wherein the control unit is configured to take a viewpoint of a video to be referred to in inter-view prediction as having a degree of importance higher than a degree of importance of a viewpoint of a video not to be referred to in inter-view prediction.

7. The video reproducing apparatus according to claim 1, wherein the control unit is configured to decrease a degree of priority of a viewpoint of an eye other than a dominant eye of a user.

8. The video reproducing apparatus according to claim 7, wherein the control unit is configured to decrease the degree of priority of the viewpoint of the eye other than the dominant eye of the user when the control unit determines that there is neither a viewpoint from which the user is viewing nor a difference in degree of importance among videos for the respective viewpoints.

9. The video reproducing apparatus according to claim 1, wherein the decoding unit comprises an interpolating unit configured to perform an interpolating process, and
   when a frame to be decoded is skipped for the load reduction, wherein the control unit is configured to cause a video of the skipped frame to be generated based on the interpolating process.

10. The video reproducing apparatus according to claim 9, wherein the interpolating unit is configured to generate the video of the skipped frame by using a video for another viewpoint.

11. The video reproducing apparatus according to claim 9, wherein the interpolating unit is configured to generate the video of the skipped frame by using videos of frames previous and subsequent to the skipped frame.

12. The video reproducing device according to claim 11, wherein the control unit is configured to cause the interpolating process to be performed when a cost of the interpolating process is lower than a cost of decoding the skipped frame.

13. A video reproducing method comprising:
in a video reproducing apparatus:
decoding coded video signals of multiple viewpoints;
detecting a process load of the decoding;
lowering a degree of priority of a viewpoint having a degree of importance lower than one or more other viewpoints of the multiple viewpoints when there is a difference in degree of importance among videos for the respective viewpoints; and
reducing a load of the decoding from one of the coded video signals that corresponds to the viewpoint with the degree of priority lower than the one or more other viewpoints in accordance with the detected process load.

14. A non-transitory computer-readable storage medium having stored thereon, a computer program having at least one code section, the at least one code section being executable by a computer for causing the computer to perform steps comprising:
decoding coded video signals of multiple viewpoints;
detecting a process load of the decoding;
lowering a degree of priority of a viewpoint having a degree of importance lower than one or more other viewpoints of the multiple viewpoints when there is a difference in degree of importance among videos for the respective viewpoints; and
reducing a load of the decoding from one of the coded video signals that corresponds to the viewpoint with the degree of priority lower than the one or more other viewpoints in accordance with the detected process load.

15. A video reproducing apparatus comprising:
a decoding unit configured to perform decoding of coded video signals of multiple viewpoints;
a load detecting unit configured to detect a process load on the decoding unit; and
a control unit configured to control the decoding unit based on the detected process load, and reduce a load of the decoding from a viewpoint with a degree of priority lower than one or more other viewpoints of the multiple viewpoints, wherein the control unit is configured to lower the degree of priority of a viewpoint with a degree of importance lower than one or more other viewpoints of the multiple viewpoints when there is a difference in degree of importance among videos for the respective viewpoints.

16. A video reproducing apparatus comprising:
a decoding unit configured to perform decoding of coded video signals of multiple viewpoints;
a load detecting unit configured to detect a process load on the decoding unit; and
a control unit configured to control the decoding unit based on the detected process load, and reduce a load of the decoding from a viewpoint with a degree of priority lower than one or more other viewpoints of the multiple viewpoints, wherein the control unit is configured to lower a degree of priority of a viewpoint of an eye other than a dominant eye of a user.

* * * * *